US008293156B2

(12) United States Patent
Leil (10) Patent No.: US 8,293,156 B2
(45) Date of Patent: Oct. 23, 2012

(54) DEVICE AND METHOD FOR PROFILE PRODUCTION WITH ROTATING DIES (75) Inventor: Gary Leil, Lindome (SE)

(73) Assignee: Arsizio AB, Kallered (SE)

( * ) Notice: Subject to any disclaimer, the term of this patent is extended or adjusted under 35 U.S.C. 154(b) by 0 days.

(21) Appl. No.: 12/744,624

(22) PCT Filed: Nov. 26, 2008

(86) PCT No.: PCT/IB2008/054956
§ 371 (c)(1),
(2), (4) Date: Sep. 14, 2010

(87) PCT Pub. No.: WO2009/069081
PCT Pub. Date: Jun. 4, 2009

(65) Prior Publication Data
US 2011/0001260 A1 Jan. 6, 2011

(30) Foreign Application Priority Data
Nov. 26, 2007 (SE) ...................... 0702659

(51) Int. Cl.
B29C 47/24 (2006.01)
(52) U.S. Cl. .................. 264/164; 264/209.2; 264/209.5; 425/436 R
(58) Field of Classification Search .................. 264/164, 264/209.2, 209.5; 425/436 R
See application file for complete search history.

(56) References Cited

FOREIGN PATENT DOCUMENTS
DE 934164 C 10/1955
WO 97/12745 A1 4/1997
WO 01/60583 A1 8/2001
WO 2004/022256 A1 3/2004

OTHER PUBLICATIONS
EPO, Int'l Search Report in PCT/IB2008/054956, May 11, 2009.
EPO, Int'l Preliminary Report on Patentability in PCT/IB2008/054956, Jun. 10, 2010.

Primary Examiner — Yogendra Gupta
Assistant Examiner — Alison Hindenlang
(74) Attorney, Agent, or Firm — Potomac Patent Group PLLC (57) ABSTRACT The invention relates to device (30) and the procedure to grip, steer and pull outgoing profile (12) for continuous industrial production of profiles with rotating dies (10), which resolves the problems caused by adhesion, friction difference and unequal material flows mainly at start up. The device and procedure solves most problems that usually cause problems in the context of the billet changes which together with the start up is causing more than 90-95% of the problems in the manufacturing of profiles with rotating bodies.

15 Claims, 7 Drawing Sheets

DEVICE AND METHOD FOR PROFILE PRODUCTION WITH ROTATING DIES

TECHNICAL FIELD

The invention relates to device and the procedure to grip, steer and pull outgoing profile for continuous industrial production of profiles with rotating dies, which resolves the problems caused by adhesion, friction differential and unequal material flows mainly at start up. The device and procedure solves most problems that usually cause problems in the context of the billet changes which together with the boot of causing more than 90-95% of the problems in the manufacturing profile of rotating bodies.

The device and the procedure is applicable in the extrusion and pultrusion of forming materials and material combinations like metal, composite metal, plastic, plastic composite, plastic-wood, clay, rubber or reinforced rubber which is shaped profile through a process involving tools with one or more solid parts as part of predefined profiles Appearance/cross-sectional profile before the end of specifically defined or varied cross-section when the material passes rotating body which can be patterned or smooth and whose position in some designs of the invention can vary quite the second bearing surfaces or rotating bearing surfaces of the tool with which they define the profile final form, whether the rotating arrays are patterned or not.

TECHNICAL BACKGROUND

With continuous profile of the manufacture of forming materials and material combinations passing the material a tool that defines the profile cross-section at the extrusion pressure through the material, in pultrusion drawn through it. The result is profiles that have the same cross-section all the way.

Often, to various applications have beams and profiles with patterns, cogs, varied thickness, anti-slip design, logo, etc. This integrated as a profile that has the same cross-section or the look all the way often does not meet the requirements to be able to satisfy customers' requirements and applications Design, Function and performance in sectors such as construction, consumer products, structural applications, transportation, aerospace, automotive and design.

The traditional methods only produce profiles and then process the varied thickness or patterns usually require significant costs for processing and processing equipment.

An alternative method for the first extruded and then process the profile is the use of rotating patterned arrays at the extrusion, leaving a "negative imprint" of the profile, while its cross section is defined.

This has been described in technical papers (ex. way "How to Extrusion embossed flexible profiles" of Pierre Hamel in Plastics Engineering strip 36, No. 6, June 1980 pp. 34-35), which describes how to use the rotary dies (engraving wheel see FIG. 1) when patterning extruded plastic profiles.

Another method to produce profiles with the pattern described in the patent EP 1272330 B1 of the innovator D. Czekay which uses a "caterpillar track" as shaping member, whose relief disparate stamping patterns are moving in approximately the same speed as the extruded profile.

Another patent that describes extrusion with rotating arrays are SE504300 (C2), which describes how to extruded ladder-similar profiles. However, it is not possible to proceed in accordance with the described patent, for example if you shall extrude materials which require high pressure to achieve sufficient plasticity, the forces on the rotating shaping member/organ would be so large due the big exposed area that it would bend and the bearings would break down. At the extrusion of aluminium, copper, magnesium, titanium, metal composites etc. the pressure can involve several thousand pounds pressure per square centimetre, which precludes the procedure described in SE 504300 (C2). This is due to forces as well as material flow conditions.

The patent SE514815 (C2) displayed a more realistic performance of extrusion using so-called rotary dies; however, this patent is very similar to Pierre Hamel's Technical Paper of 1980.

Both patent SE504300 (C2) and patent SE514815 (C2) can be said to describe the approach of extrusion dies with rotating dies according to Pierre Hamel instructions from 1980.

SE514815 (C2), however, is in fact strongly limited in their opportunities in the thin extruded profiles, advanced cross-sections with varied thickness and varied depth, great depth of pattern, hollow sections, weak profiles and asymmetric profiles due to the problems with adhesion between the thin weak profile wall and the rotating die member due to adhesion and interference adhesion between the rotating members surface and the extruded material.

Figure 4:
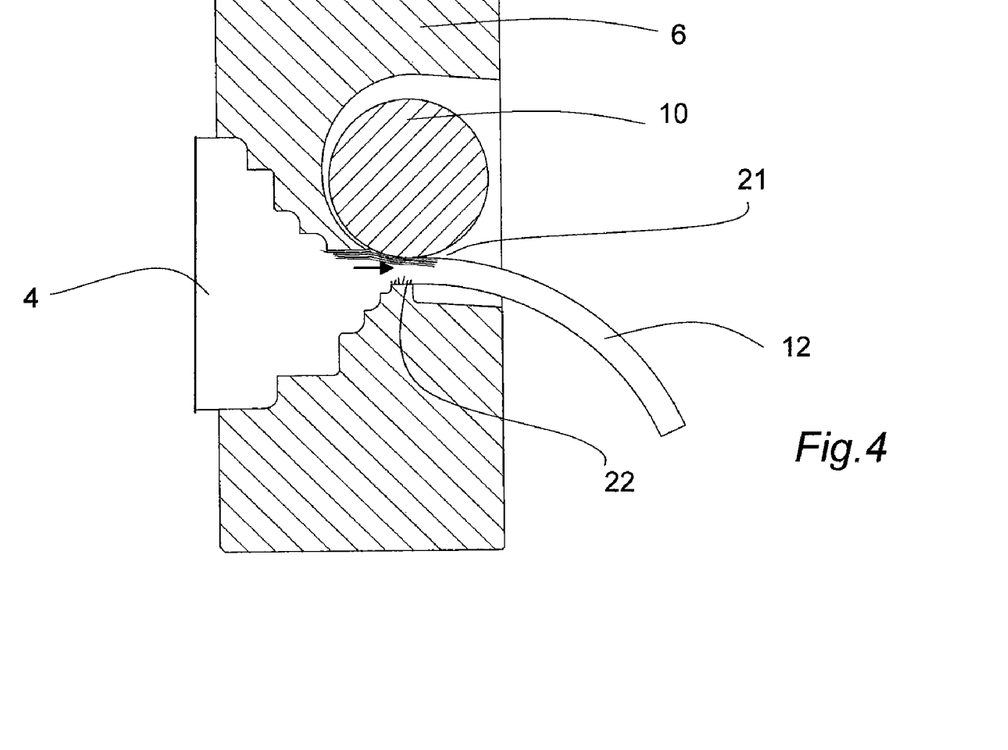
FIG. 4 shows how the profile deviates due to friction difference.

Another factor that hampers performance under SE514815 (C2) is the friction difference see FIG. 4, which is inevitable between the rotary bearing surfaces (10) and static bearing surfaces (22), as in the cases when elimination of adhesion between the out-going profile (12) and rotating bearing (10) is achieved, resulting in the greater friction in the static bearing surface brakes outgoing material speed and cause a "local imbalance in the flow" resulting in deviation away from rotating die.

Figure 2:
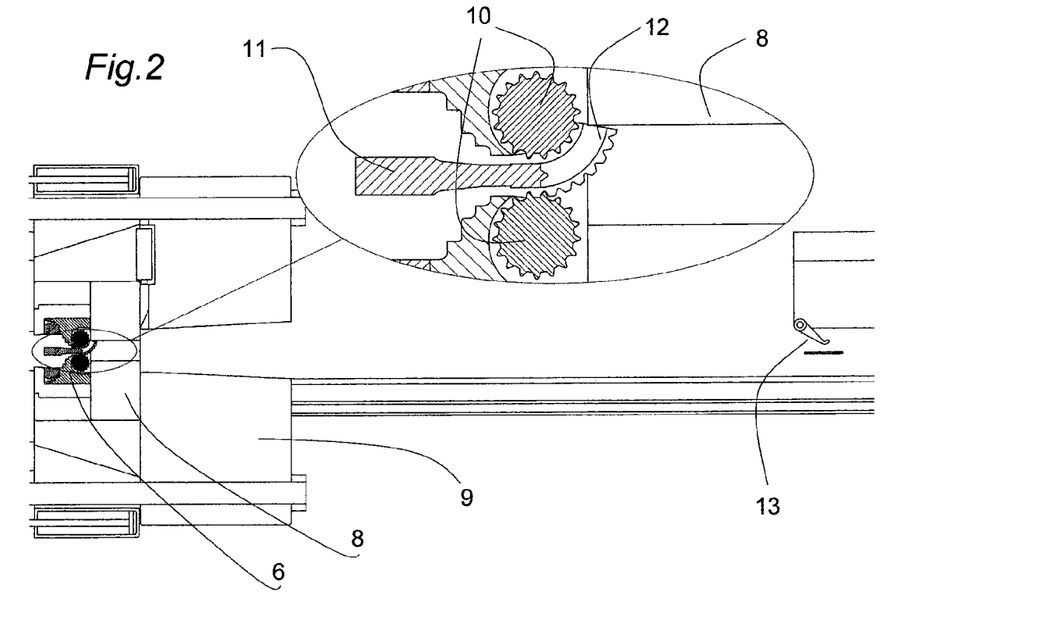
FIG. 2 shows an example of process breakdown, in connection to start-up of extrusion process.
Figure 3:
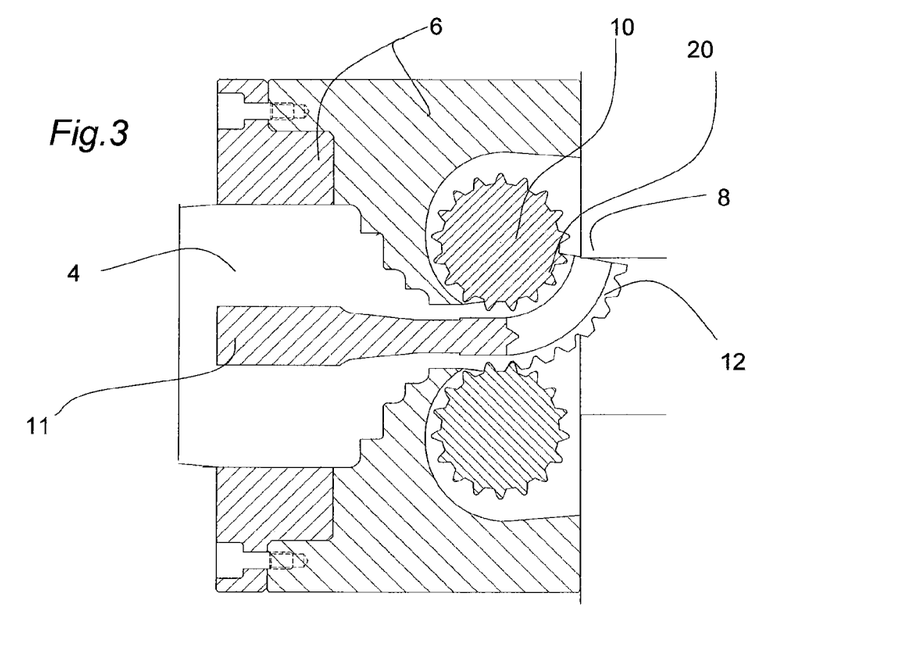
FIG. 3 shows a close up of tool in FIG. 2.

The same applies when extruding profiles with great imprint-depth relative to wall-thickness, see FIGS. 2 & 3, the profile often tend to "follow with" a rotating member at start-up and billet-changes, resulting in very high risk of process-breakdown and tools-breakdown, when the outgoing material locks the rotating member or get stuck on the way out of the die.

Problems with the start-up have made it practically impossible to industrialise the production profile extrusion with rotating dies. This as a result of that market do not ask for the simple, solid, thick and mainly symmetric profiles with relatively shallow pattern without thickness variation, that has been possible to produce.

The present invention makes it possible to make stable starts of extrusion process, in other words, the prospect of industrial, manufacturing of commercially viable products/profiles, which opens for the industrialization of the production of profiles with rotating dies, both through increased process stability and significantly increase in the degree of freedom, which is made possible.

Earlier, attempts have been made with rotating dies to get some variations, however, this has been problematic for purposes of the weak, thin profiles or hollow sections, or profiles with advanced cross-section, above all because of problems at start up due to adhesion between the rotating die and extruded material as well as flow imbalance.

The application of the present invention is applicable to all types of pultrusion and extrusion lines, with minimal or no adaptation needs of the facility, including hydraulic presses for metal extrusion, screw extruders for rubber/plastic, conform extrusion machines and pultrusion lines.

SUMMARY OF THE INVENTION

The invention relates to device and method for the start up, steering/pulling and gripping of outgoing material and process stabilization in the profile production with rotating die members, enabling stable industrial continuous production of both solid as well as thin and hollow profiles. The device and method is based on taking immediate control of outgoing profile with gripping actuators that grips, pulls & steers the outgoing material when it comes out of the tool and in certain configurations, it means that it also takes control of the profile, in the tool, before the rotating dies get in contact with extruded material and are forming the outgoing material, in order to fully eliminate the problems caused by adhesion between rotating members and profile at start up, and eliminates/reduces the problems caused by uneven material flow at start up and friction difference between rotating and static bearing surfaces, which accounts for most of the process breakdowns and accidents at start up and billet changes.

The gripping & steering puller is commonly used to grip steer & pull the profile up to ordinary puller, but can also be used as an extension to the ordinary puller.

The gripping & steering puller can also be used to create curved shapes, which they will tackle the profile and give it its correct curvature. The gripping & steering puller can also be affixed on an industrial robot, which can provide good opportunity for a large variation possibilities combined with short set times.

The device and method is adapted to be compatible with existing Extrusion and pultrusion lines, enabling rapid tool changes and rational, economic, efficient production, without major investment.

The device/method is applicable for both extrusion and pultrusion, and is well suited for manufacturing of both profiles and components in any plastically deformable material (11) such as ceramic, metal, composite metal, metal matrix, plastic, wood filled plastic, plastic composite, plastic or rubber, that is shaped as a profile (12) through a process involving die with a fixed part (6), which partially predefines profile appearance/cross-section before the specifically definition or varied cross-section is obtained when the material passes rotating body (10) that can be patterned or smooth which bearing surface/surfaces and location relative the other bearing surfaces in the tool is defining the profiles final form, whether the rotating bodies are patterned or not and where there may also be possible to vary the cross section by varying the rotating bodies position relatively the other bearing surfaces, whose position in some designs of the invention can vary relatively to other bearing surfaces (see FIGS. 8A & 8B) of the tool with which they define the profiles final shape & cross section.

Figure 5:
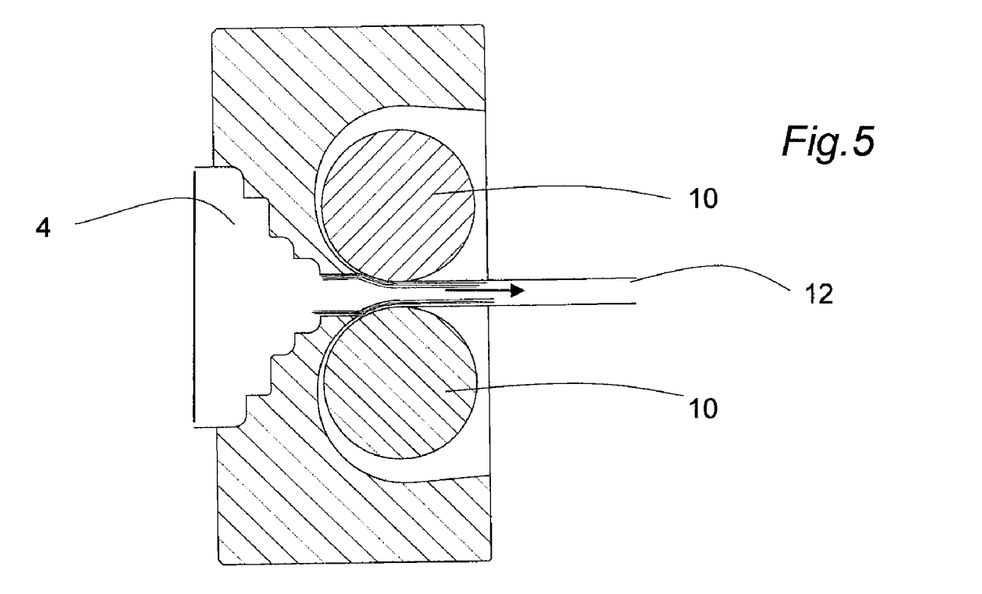
FIG. 5 shows examples of profile created by rotating dies on both sides.

The purpose of the present invention is to enable industrial, repeatable production of one or more profiles with patterns and/or varying cross section and solve problems especially with the start up, making it possible to:

1. make profiles with thinner goods
2. make smaller and weaker profiles
3. make profiles with greater imprint depth relative to wall thickness
4. make asymmetric profiles that tend to deviate at start up.
5. produce multiple profiles simultaneously (by gripping & steering puller device with multiple gripping devices, which ensures that all profiles are guided and pulled properly).
6. make the start up execution is safe for the extrusion staff, by eliminating dangerous manual operations where operators take hold of outgoing profiles by example pliers or tube tong to try to pull & steer the profile by hand (something that rarely helps, then hand power not enough in most profiles, and we are still not reaching the way into the tool, and can not grip/control the profile if it starts to deviate, see FIG. 2 & FIG. 4).
7. enhance process control and impose stretch immediately, which reduces the forces significantly in the tool at start up.
8. make it possible to effectively produce profiles in tools with two or more opposing rotating die members that defines the profile cross-section without guiding, straight static bearing surfaces see FIG. 5.
9. eliminate the stop that occurs when the profile has reached the ordinary puller 13a after start up, which always results in cassation around the "stop-label" (the area surrounding the point where the profile came to a halt in the tool)
10. eliminate the "sun bend" which occurs on the profile if the puller is beginning to stretch after that profile started to move out of the tool, which often results in the profile scrunch where it is softest & warmest—at the end of the tool and therefore follows with the rotating body around until it stuck with the process breakdown (and sometimes also tools breakdown) as a result.

The invention will make it possible to further vary the profile section over the desired cycle without being limited to the cycle that corresponds to the/the rotating array/die of the perimeter.

By the possibility to vary the thickness and/or vary+eliminate depth makes it possible to minimize the adhesion between the extruded profile at start up and billet changes, while making thicker walls profile in these moments, in order to further stabilize the process and eliminate the problems that so far has eliminated successful commercial extrusion with rotating dies.

Explanations of Context, Nomenclature and Words Used in this Patent Document:

Extrusion:

Procedure in which a material under pressure, pressed through a profile shaping tool (also called die) with hole(s) that defines the outgoing materials cross-section and appearance. Extrusion can be performed in most metals, metal matrix, thermal resins, some fibre composite mixtures, ceramics, clay, rubber, candy, food (e.g. pasta, etc.).

Pultrusion:

In contrast to the extrusion means the profile drawing. Pultrusion generally means that a continuous fibre bundle impregnated with liquid resin drawn through a heated matrix. Resin impregnation occurs in a resin bath. The most common material is glass-reinforced unsaturated polyester. Other core epoxy resins and PolyUrethane are used depending on the application. Often used fibrous material in the form of woven or felt fabric, resulting fibre beam to achieve strength in the transverse direction. Pre-preg fibres (Fibres that are pre-impregnated with resin), can also be used.

Dynamic Extrusion:

Procedure in which a material under pressure, is pressed through a tool/die with rotating forming members/dies that can give the profile a diverse
  cross-section and/or appearance in the form of e.g. patterns on one or more surfaces and dimensional changes in cross-sectional area and or goods thicknesses.

Dynamic Pultrusion:

Procedure whereby one/several material(s) drawn through a die/tool with rotating forming members/dies that can give the profile a diverse cross-section and/or appearance in the form of e.g. patterns on one or more surfaces and dimensional changes in cross-sectional area and or goods thicknesses.

Die:

Generally, the name used by professionals for profile forming tools.

Rotating Die:

Rotating profile-shaping part/organ of the tool for dynamic extrusion/pultrusion.

Process Collapse/breakdown:

Generic name for the failure of the start up of extrusion/pultrusion or problems at billet exchange, production, etc. that results in production stop. The high proportion of process-breakdowns has made the industrialization of the production of profile with rotating dies very problematic.

Pressure-drop:

Reduction of pressure by the tool is a result of area-reduction, plastic exemplary work and friction. At metal extrusion converted large amounts of energy to heat, as a result of pressure. By "pressure drop balancing"—making adjustments to the pressure drop in the tool, the outgoing material get the same speed in all parts.

Flow Imbalance:

Imbalance means that the outgoing material will or want to come out with higher or lower speed at certain parts of the profile cross-section. A profile extruded in a tool with the imbalance may be less resistant (due to internal tensions), tend to DENT or bend and at the extrusion with rotating dies result is often the process breakdown.

Bearing Surface:

The surface of an extrusion die in the smallest cross section that the extruded material is forced through under pressure and thus constitutes the surface to finally define the profile cross-section and appearance.

Static Bearing Surface:

A solid bearing surface the extruded material is forced to pass at a relative speed of outgoing profile speed, because it is static, so that means there is a speed difference between the static bearing surface and the extruded material, resulting in a lot of friction and heat. By regulating the length of the bearing surfaces can regulate the total amount friction and thus the pressure and speed of the outgoing material.

Rotating Bearing Surface:

A rotating bearing surface is a surface of the rotating die/member that defines the profile cross-section, making patterns possible as well as wall-thickness variation. A rotating bearing surface in general generates much less resistance/friction against the flowing material than a static bearing surface, which previously has created major problems with the imbalance between the different parts of the profile cross-section, which is defined by the rotating bearing surfaces and the parts that are defined by static bearing surfaces. This has often resulted in the process breakdown at start up. At profile manufacturing with use of present inventions device and method the problems with this, is radically reduced, through the gripping, steering and pulling of the profile in the right direction already in the tool. If you lift the rotating bearing surfaces at start up and let the gripping, steering puller go into the tool, elimination of deviating profile that can cause process failure is achieved.

Pre-bearing/Pre-bearing Surface:

The surface area that the extruded material passes just before it comes to the rotating die/forming member and its rotating bearing. The pre-bearing brings down the material cross section so much so that the subsequent rotating die wont have to take up unnecessarily large forces from the extruded material. Pre-bearing has in combination with preceding shape in the die upstream a central role for control and/or redulation of material flows through the die.

Puller/profile Puller:

At the extrusion of metal profiles, it is customary that when one has squeezed out enough profile to reach the ordinary puller (usually 3-7 feet from the tool) to stop extrusion, grip profile and then pull the profile and then re-start the extrusion. Some modern plants use dual-pullers, which means increased productivity and reduction of the number of stop and stops and downtime.

Dynamic Extrusion and Dynamic Pultrusion:

With dynamic extrusion and dynamic pultrusion of plastically/thermally formable materials by utilising rotating dies/forming members integrated in extrusion dies for shaping for example, metal, rubber, plastics, metal composites/metal matrix, ceramic and plastic through a profile tool, (also called die), which has one or more rotational forming members/dies, in the static die and where outgoing materials cross-sectional profile to some extent as in Pierre Hamel Technical Paper, has been defined before the extruded material reach the rotating die/member whose outer radius and/or pattern defines a rotating bearing surface that finally defines the profile appearance and cross section in conjunction with other bearing surfaces in the die.

These aims are achieved by the invention as below will be described in different examples of the invention: The rotating forming members/dies can be patterned as well as smooth, or combinations out of both.

The rotating form shaping members can be raised and lowered independently of the other cycles in the process.

BRIEF DESCRIPTION OF DRAWINGS

The present invention will be described in the following with reference to the attached drawings, which in purpose of showing examples of how the invention can be done within the scope of the invention.

The invention is not limited to the embodiments described and illustrated herein but could be varied in many ways within the scope of the appended claims for example it can be carried out by experts with one or more combinations of the different variants and with several rotating dies and with alternative gripping/actuators in other types of profile production facilities utilising rotating dies than those in the drawings on display.

DESCRIPTION OF PREFERRED EMBODIMENTS OF INVENTION

Figure 1:
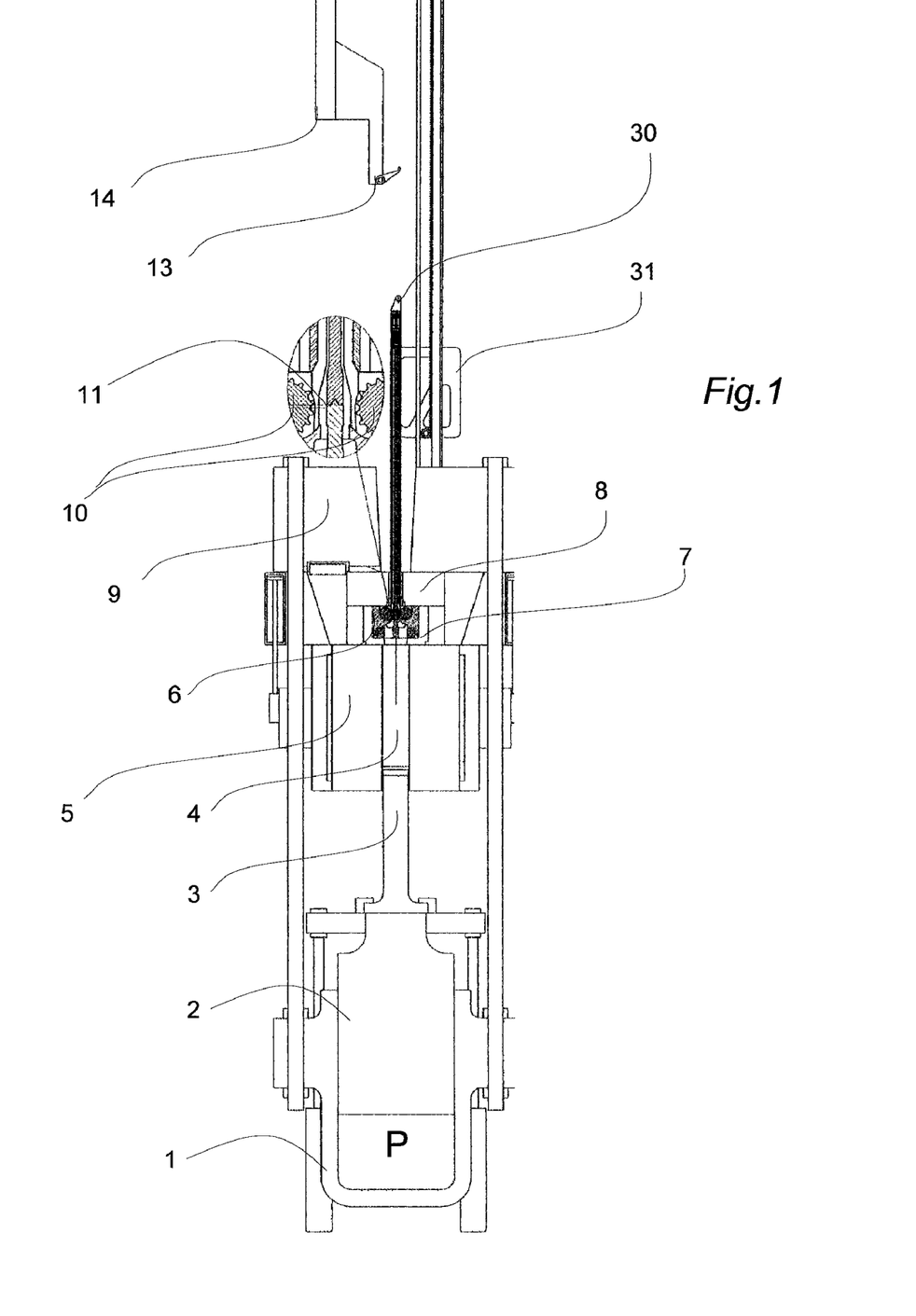
FIG. 1 Shows overview with complete extrusion-line fitted with a device according to present invention, where the rotating dies are lifted up in their top positions to allow for gripping & steering puller to grip and take control of the outgoing material.

FIG. 1 Shows overview with complete extrusion-line equipped with gripping & steering puller device (30) acc. to present invention, complete with pulling actuator (31), where the rotating dies (10) are in their external positions so that gripping & steering puller (30) can go right into the die (6), where gripping & steering puller (30) is ready to embrace, grasp, pull and steer the outgoing material from the tool and guide/drag it up to ordinary gripping device (13) and puller (14).

FIG. 2 shows example of process breakdown, at start up of extrusion with rotating profile shaping members/dies (10), caused by the immediate deviation of the profile (12) in the die (6) due to adhesion between the rotating member/die (10) and shaped outgoing material (12). Due to the fact that the outgoing material (12) hits the die support plate (8) during the start up of the extrusion process, it is resulting in process breakdown before the profile is possible to grip manually at the end of the front plate (9), long before the profile reaches the ordinary puller & gripping device (13), due to lack of guidance/steering and stretch/pull in the initial phase of start up.

FIG. 3 shows enlargement of die in FIG. 2 and clearly shows that the hole shaping die core portion (11) is powerless to control the outgoing profile (12) once it has occurred adhesion/grip between outgoing profile (12) and rotating member (10).

FIG. 4 shows how the profile deviates due to friction-difference between rotating bearing surface (21), which gives low friction resistance as the rotating body rotates easily and brakes the material less than the static bearing surface (22) with high friction resistance. As a result the profile tends to move faster on the side where it is shaped by the rotating die.

FIG. 5 shows an example of a profile created with rotating dies on both sides, the profile is largely created in the absence of straight directional bearings that has power to guide/steer the profile, which means that the profile will be extra sensitive to the adhesion between rotating members/dies (10) and outgoing profile (12), as well as pressure-drop variations and variation in the rotation resistance between the rotating members/dies.

Figure 6:
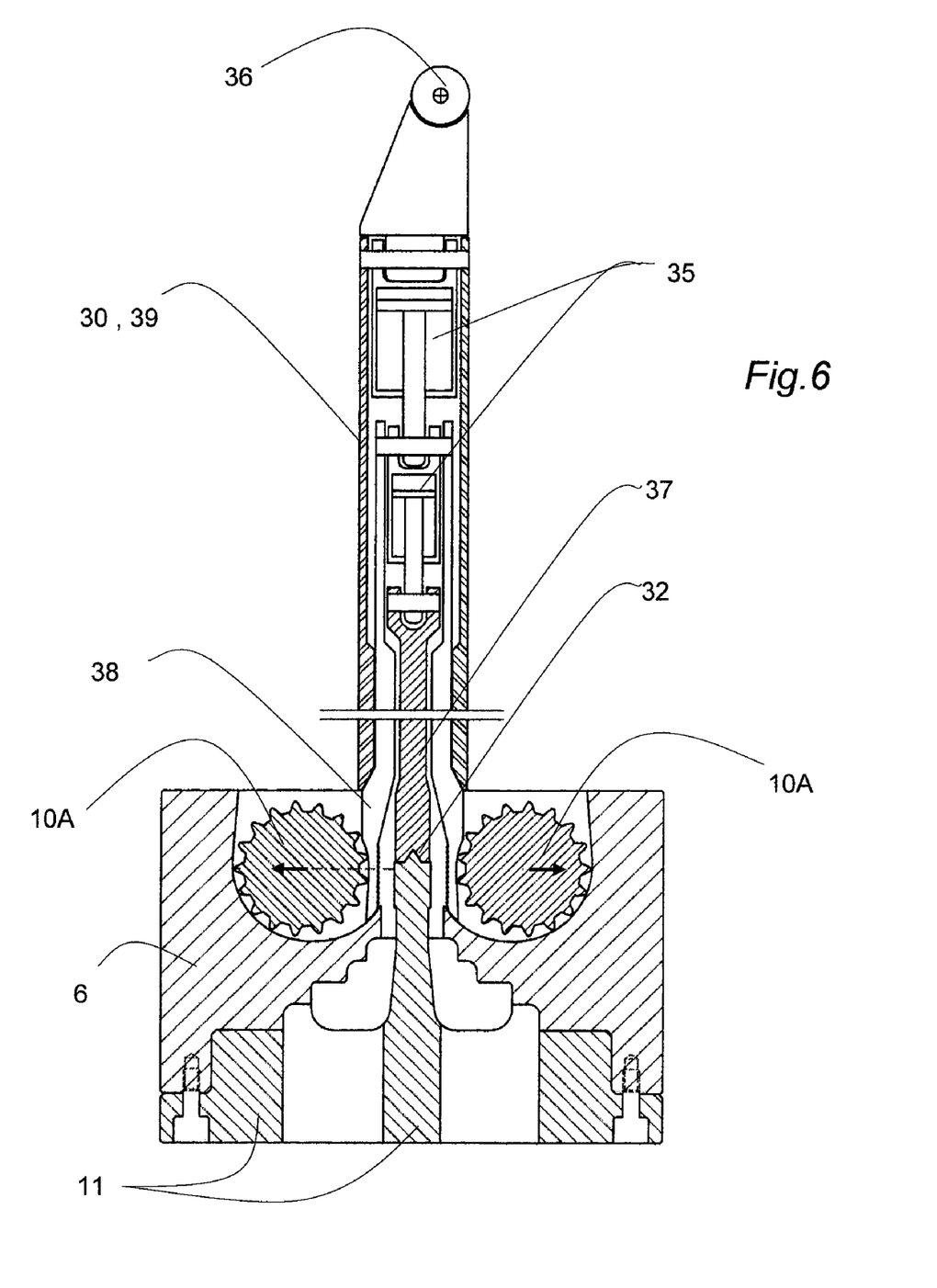
FIG. 6 shows the die (6, 11) and the gripping & steering puller (30) is ready for start up.
Figure 7:
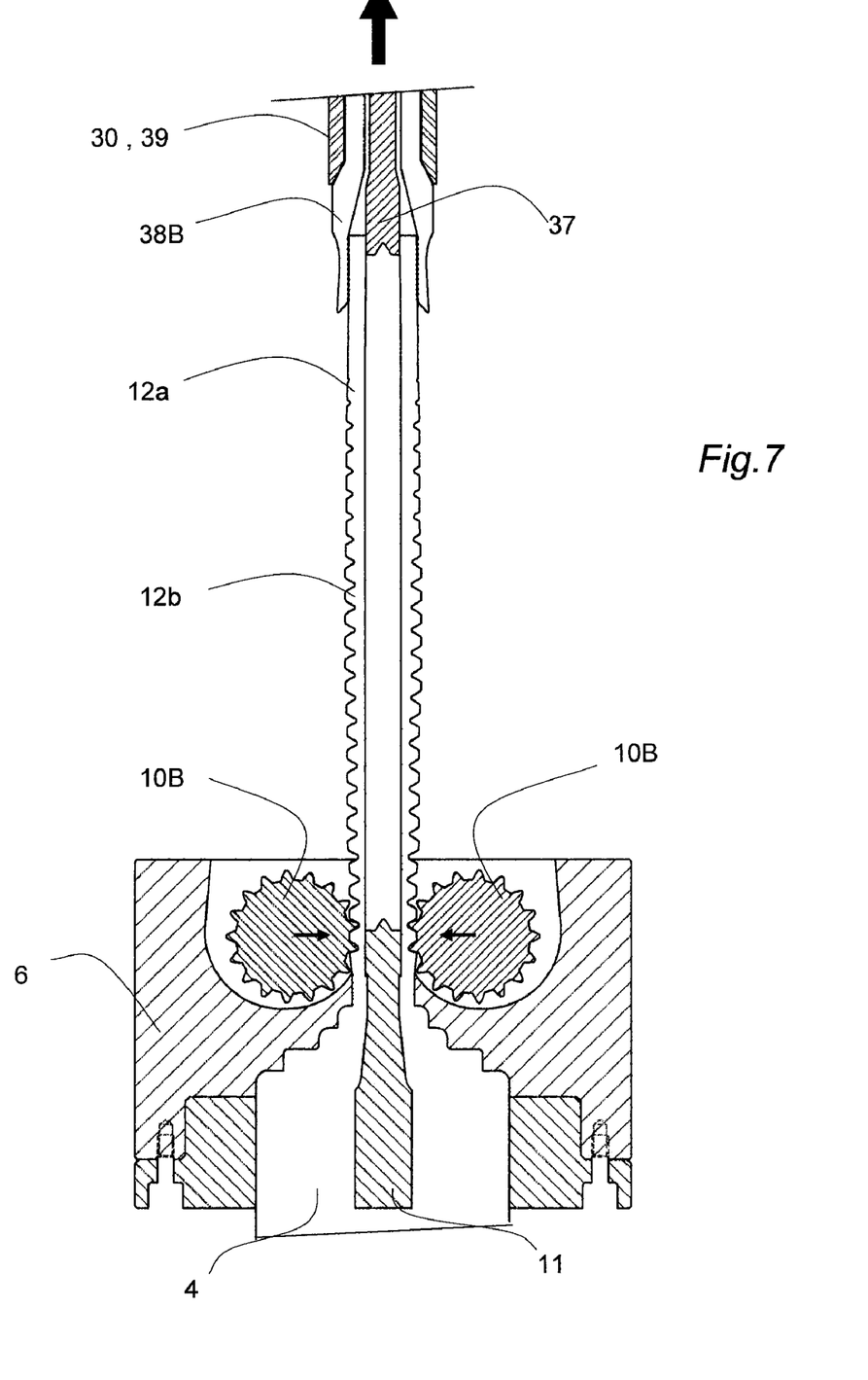
FIG. 7 shows how the gripping & steering puller (30) pulls/steers the profile, it has gripped (38) and how the rotating dies (10B) has entered production mode after the start up, which means that the outgoing material in the profile has gone from being a smooth profile in the starting moment (12A) to be a patterned profile (12B).

FIG. 6 shows the device and procedure before the start up: die (6, 11) with the guiding cone (32) with rotating forming members/dies (10A) in the raised position with the gripping & steering puller (30) consisting of gripping device (38), guide (37); grip-activating body (35), lance (39), lance end with rotating wheels (36) in this Figure the gripping & steering puller device is open and ready to receive, grip, steer and pull outgoing material in the desired direction, before it has a chance to deviate. FIG. 7 shows how the gripping & steering puller (30) pulls/steers the profile (12), which it has in an enclosing grip (38) and how the rotating forming members/dies (10B) has gone into production mode after the initial start up, which means that outgoing material in the profile gone from being a smooth profile in the starting moment (12A) to be a patterned profile (12B).

Figure 8A:
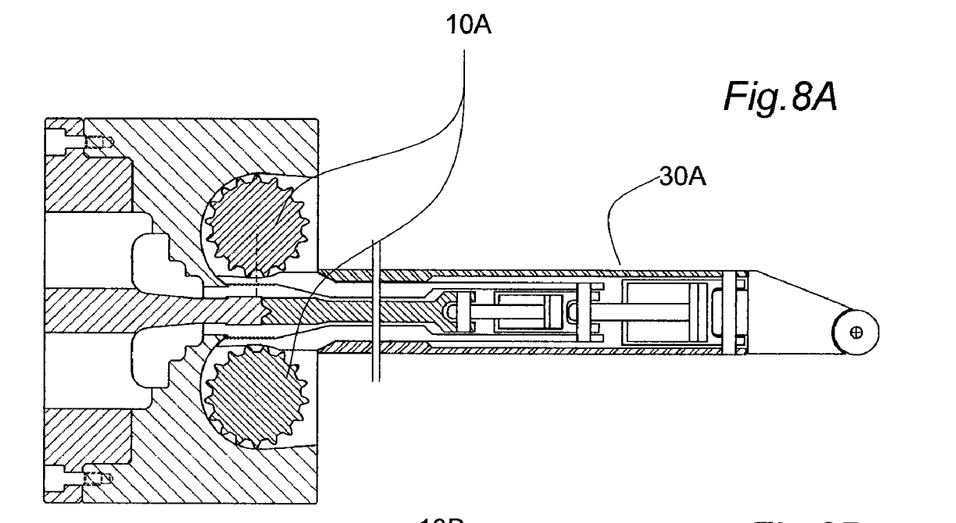
FIG. 8A shows how the device is ready for the process start-up.
Figure 8B:
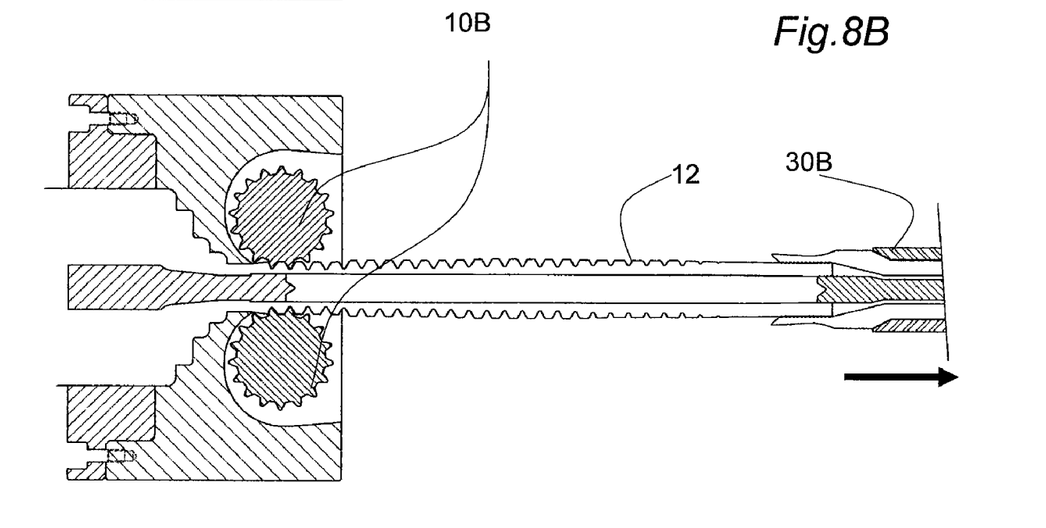
FIG. 8B shows the device and the procedure shortly after process start up.

FIGS. 8A+8B shows how the device and procedure/method is combined to provide a stable start up:

FIG. 8 shows how the device is ready for the start-up process, with the gripping & steering puller (30A) in the die past the rotating dies (10A), ready to grip, steer and pull outgoing material before it can deviate and cause process breakdown.

FIG. 8B shows how the gripping & steering puller (30B) has the profile in a steady grip and pulls it in the desired direction, while the rotating dies (10B) has gone into production mode and started to shape the outgoing material.

Figure 9A:
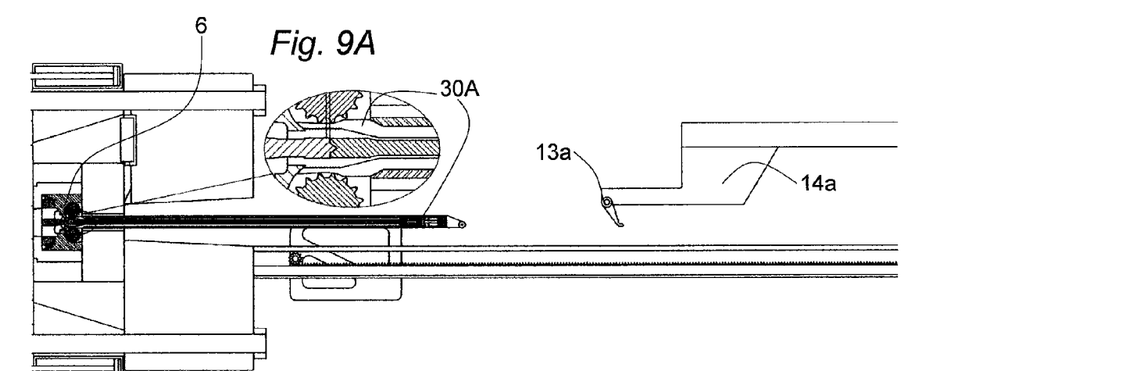
FIG. 9A shows the device and the procedure under the invention before start up.

FIG. 9A shows how the gripping & steering puller (30A) has entered the extrusion-line past the front plate and support plate all the way to the very extrusion die (6) ready to grip, steer and pull outgoing material in the right direction long before the extrusion lines ordinary puller (14) and ordinary gripping device (13a) can do it.

Figure 9B:
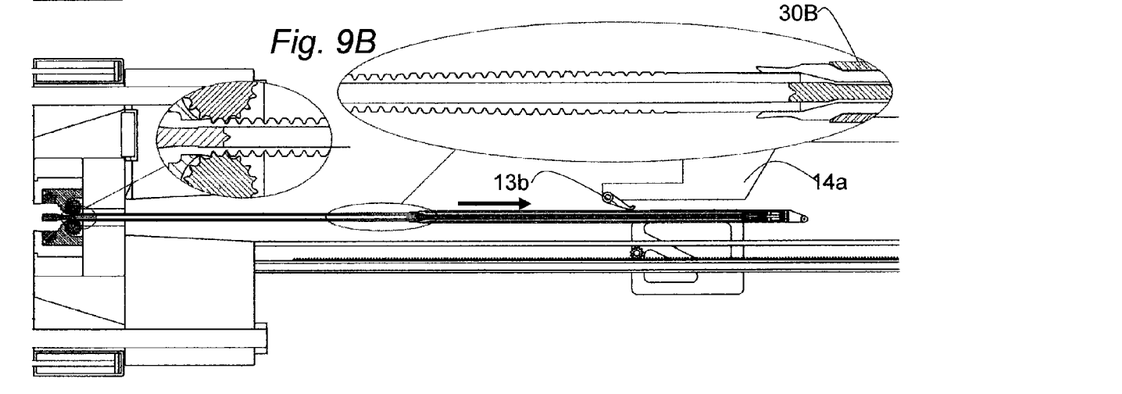
FIG. 9B shows the device and the procedure under the invention at the beginning of extrusion.

FIG. 9B shows how the gripping & steering puller (30B) has taken a firm grip of out-going material and pulls it through the ordinary gripping device (13b) so that ordinary puller (14a) shall be able to pull the outgoing material once it has reached the ordinary gripping device.

Figure 9C:
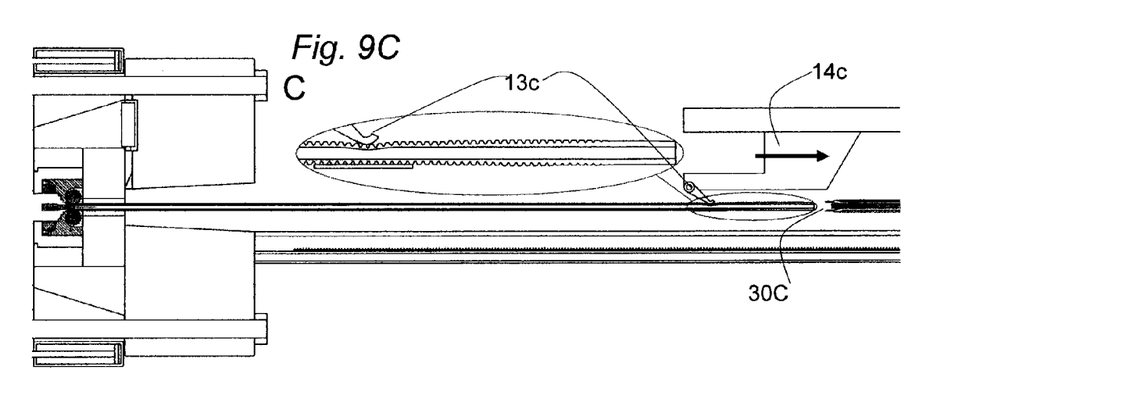
FIG. 9C shows the device and the procedure under the invention, just after the profile has been pulled through the ordinary puller, which has taken over the pulling of the profile.

FIG. 9C shows how gripping & steering puller has pulled outgoing material to the ordinary gripping device (13C) thus making it possible for it to grip the profile so that it can be pulled & guided by the ordinary puller (14c) that begins to pull the outgoing profile—without manual intervention, stop interruptions, or risk for the process breakdown caused by deviating of outgoing material. Gripping & steering puller (30C) has released the profile and moved laterally, ready for the next start-up or billet-change where it can ensure that the profile is pulled/stretched when outgoing profile is being cut in extrusion lines that lacks dual ordinary pullers.

The invention claimed is:

1. A device for gripping, steering, and pulling outgoing material and stabilizing a profile production process with rotating dies, including a gripping device configured to grip outgoing material, a lance configured to allow outgoing material to enter through a front plate and a support plate to a static die containing activating bodies for a gripping device configured to grip solid profiles and thing and hollow profiles in process and start up of dynamic extrusion and dynamic pultrusion of plastically deformable materials of profiles using rotating forming die members for shaping profiles and products formed at a crossing of profile dies which has or interacts with one or more rotating dies, at or in the static die, wherein the gripping device is disposed in between the rotating dies and outgoing material at start up to grip and steer outgoing material before it comes in contact with the rotating dies.

2. The device of claim 1, wherein at least one of the gripping device and steering device goes into the static die.

3. The device of claim 1, wherein the device is configured to pull and steer the outgoing material in whole or in part in a desired direction.

4. The device of claim 1, wherein the lance and the gripping device are configured to go through the dies and support plate.

5. The device of claim 1, wherein the gripping and pulling devices are configured to be steered by a steering pin or cone in the static die or support plate to ensure correct positioning.

6. The device of claim 1, wherein it is attached to an industrial robot and is configured to grip steer, and pull outgoing material immediately after it comes out of the static die.

7. The device of claim 1, wherein the gripping device is configured to be steered by a steering pin or cone in the static die or support plate to ensure correct positioning and to assure that outgoing material cannot deviate.

8. The device of claim 1, wherein the gripping device goes into the static die and steers the profile.

9. A method of producing profiles with rotatable dies, including a gripping and steering puller device configured to grip and steer outgoing material of either solid profile or thin and hollow profile when performing dynamic extrusion and dynamic pultrusion of plastically deformable materials at profile manufacturing with rotary profile forming dies, wherein the gripping and steering puller device goes in between the rotatable die and outgoing profile and grips the profile in the tool before a rotatable bearing surface has completed a first lap in contact with outgoing profile.

10. The method of claim 9, wherein one or more steering guides connects directly to one or more guides at or close to the bearings in the die.

11. The method of claim 9, wherein the gripping and pulling device pulls and steers outgoing material up to and through an ordinary gripper attached to an ordinary puller.

12. The method of claim 9, wherein a gripping and steering puller pulls the outgoing profile up to and through a regular gripping device attached to an ordinary puller that continues to draw the profile without interruption after gripping the profile on the fly, after which the gripping and steering puller releases the profile that is pulled and guided by the ordinary puller, whereupon the gripping and steering puller is moved sideways out of the way of the outgoing profile and ordinary puller.

13. The method of claim 12, wherein the gripping and steering puller device is connected to an ordinary puller.

14. The method of claim 12, wherein the gripping and steering puller device grips the outgoing profile and starts to steer and pull it in a right direction.

15. The method of claim 12, wherein the gripping and steering puller device grips the outgoing profile and starts to steer and pull it in a controlled bending to achieve a desired curvature of the profile.

* * * * *